(12) United States Patent
Chen et al.

(10) Patent No.: US 11,702,102 B2
(45) Date of Patent: Jul. 18, 2023

(54) FILTERING RETURN POINTS IN A POINT CLOUD BASED ON RADIAL VELOCITY MEASUREMENT

(71) Applicant: Waymo LLC, Mountain View, CA (US)

(72) Inventors: Mingcheng Chen, Sunnyvale, CA (US); Yunshan Jiang, Mountain View, CA (US); Xiaoxiang Hu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 306 days.

(21) Appl. No.: 16/952,930

(22) Filed: Nov. 19, 2020

(65) Prior Publication Data

US 2022/0153297 A1    May 19, 2022

(51) Int. Cl.
*B60W 60/00* (2020.01)
*G01S 13/931* (2020.01)
*G01S 13/50* (2006.01)
*G06V 20/58* (2022.01)

(52) U.S. Cl.
CPC ....... *B60W 60/0011* (2020.02); *G01S 13/505* (2013.01); *G01S 13/931* (2013.01); *G06V 20/58* (2022.01); *B60W 2420/52* (2013.01); *G01S 2013/9321* (2013.01); *G01S 2013/9327* (2020.01)

(58) Field of Classification Search
CPC .................................................. B60W 60/0011
See application file for complete search history.

(56) References Cited

U.S. PATENT DOCUMENTS

| | | | |
|---|---|---|---|
| 9,261,881 B1 * | 2/2016 | Ferguson | G01S 17/931 |
| 11,002,856 B2 * | 5/2021 | Heidrich | G01S 7/4911 |
| 2019/0317219 A1 * | 10/2019 | Smith | G01S 7/4802 |
| 2021/0261159 A1 * | 8/2021 | Pazhayampallil | B60W 10/18 |
| 2022/0075067 A1 * | 3/2022 | Dussan | G01S 17/10 |
| 2022/0128995 A1 * | 4/2022 | Chen | G01S 17/66 |
| 2022/0137227 A1 * | 5/2022 | Armstrong-Crews | B60W 30/09 701/26 |

* cited by examiner

*Primary Examiner* — Michael A Berns
(74) *Attorney, Agent, or Firm* — Lowenstein Sandler LLP

(57) ABSTRACT

Aspects and implementations of the present disclosure relate to filtering of return points from a point cloud based on radial velocity measurements. An example method includes: receiving, by a sensing system of an autonomous vehicle (AV), data representative of a point cloud comprising a plurality of return points, each return point comprising a radial velocity value and position coordinates representative of a reflecting region that reflects a transmission signal emitted by the sensing system; applying, to each of the plurality of return points, at least one threshold condition related to the radial velocity value of a given return point to identify a subset of return points within the plurality of return points; removing the subset of return points from the point cloud to generate a filtered point cloud; and identifying objects represented by the remaining return points in the filtered point cloud.

20 Claims, 10 Drawing Sheets

FILTERING RETURN POINTS IN A POINT CLOUD BASED ON RADIAL VELOCITY MEASUREMENT

TECHNICAL FIELD

The instant specification generally relates to autonomous vehicles. More specifically, the instant specification relates to improving object classification and tracking in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend significantly on timely and accurate identification of various objects present in the driving environment, and on the ability of a driving algorithm to quickly and efficiently process the information about the environment and provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures.

SUMMARY

Figure 1:
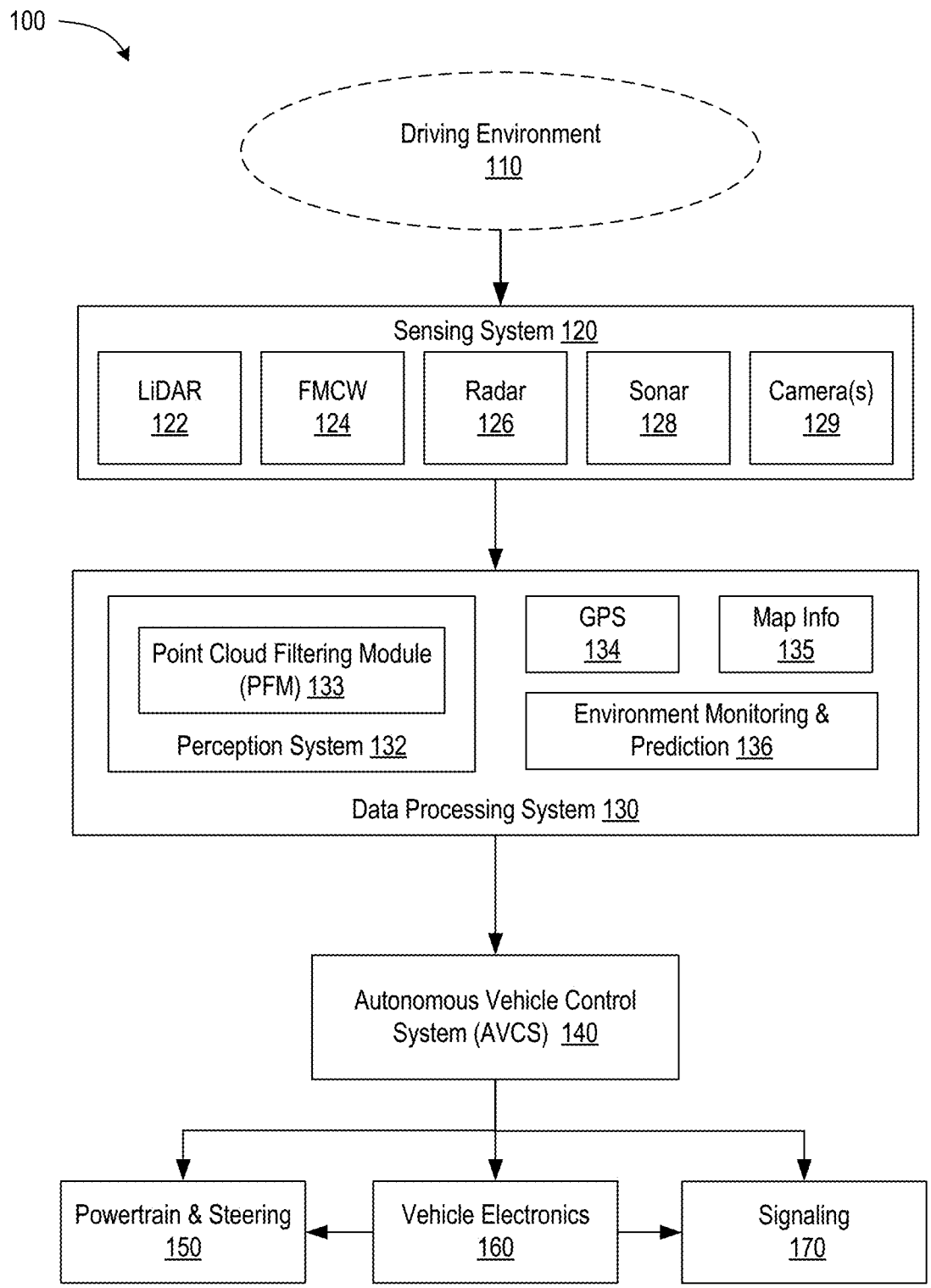
FIG. 1 is a diagram illustrating components of an example autonomous vehicle that uses Doppler-assisted object identification and tracking, in accordance with some implementations of the present disclosure.

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the present disclosure, a method of filtering return points in a point cloud based on radial velocity measurements comprises: receiving, by a sensing system of an autonomous vehicle, data representative of a point cloud comprising a plurality of return points, each return point comprising a radial velocity value and position coordinates representative of a reflecting region that reflects a transmission signal emitted by the sensing system. At least one threshold condition is applied to each of the plurality of return points, with the threshold condition being related to the radial velocity value of a given return point, to identify a subset of return points within the plurality of return points. The subset of return points is removed from the point cloud to generate a filtered point cloud. Objects represented by the remaining return points in the filtered point cloud are identified. In some implementations, a driving path of the autonomous vehicle is determined in view of the identified objects.

In certain implementations, the sensing system of the AV comprises a coherent light detection and ranging device, and wherein the signal emitted by the sensing system comprises a frequency-modulated continuous wave (FMCW) signal. In certain implementations, the radial velocity values for each of the plurality of return points are derived from reflected FMCW signals.

In certain implementations, applying the at least one threshold condition comprises classifying, as static points, return points determined to have a radial velocity that, when offset by a velocity of the AV, is within a threshold radial velocity. The subset of return points corresponds to the classified static points. In certain implementations, the threshold radial velocity is from 0.01 meters/second to 0.2 meters/second.

In certain implementations, the return points in the subset of return points correspond only to points having position coordinates that are determined to be outside of a roadway traversed by the AV in view of road map data.

In certain implementations, applying the at least one threshold condition comprises, for each return point, classifying, as self-return points, return points determined to be encompassed by a low-polygon mesh representative of the AV and having substantially zero radial velocity with respect to the AV. The low-polygon mesh is defined to encompass the physical geometry of the AV, and the subset of return points corresponds to classified self-return points. In certain implementations, the low-polygon mesh is defined by 4 to 1,000 vertices.

In certain implementations, applying the at least one threshold condition comprises classifying, as ground points, return points determined to be less than or equal to an elevation threshold with respect to the ground and having substantially zero radial velocity when offset by a velocity of the AV. The subset of return points corresponds to the classified ground points. In certain implementations, the elevation threshold is from 5 cm to 30 cm.

In another aspect of the present disclosure, a system comprises a sensing system of an autonomous vehicle to perform any implementation of the method described above.

In another aspect of the present disclosure, a non-transitory computer-readable medium has instructions stored thereon that, when executed by a computing device, cause the computing device to perform any implementation of the method described above.

DETAILED DESCRIPTION

An autonomous vehicle can employ a light detection and ranging (LiDAR) technology to detect distances to various objects in the environment and, sometimes, the velocities of such objects. A LiDAR emits one or more laser signals (pulses) that travel to an object and then detects arrived signals reflected from the object. By determining a time delay between the signal emission and the arrival of the retro-reflected waves, a time-of-flight (ToF) LiDAR can determine the distance to the object.

ToF LiDARs are capable of determining the velocity (speed and direction of motion) of a return point by emitting two or more signals (as part of different sensing frames) in a quick succession and detecting the position of the reflecting surface as the surface moves between each additional frame. The intervals between successive signals can be short enough so that between consecutive signals (frames) the object does not change its position appreciably in relation to other objects of the environment, but still long enough to allow the LiDAR to accurately detect the changes in the object's position. However, ToF LiDAR devices are generally incapable of determining velocities of objects based on a single sensing frame.

Coherent LiDARs take advantage of a phase information encoded into transmitted signals and carried by the emitted electromagnetic waves to the target and back and provide additional functionality unavailable in the standard ToF LiDAR technology. A coherent LiDAR detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent LiDAR allows, in addition to obtaining the range information, associating a radial velocity with the return points of the point cloud (radial velocimetry). This additional information enables velocity reconstruction and tracking of various objects by determining the character of the (translational and rotational) motion performed by the objects. In particular, a motion of a rigid body (such as a body of a car, a truck, an airplane, etc.) is typically constrained by a condition that a distance between two arbitrarily chosen points of the body remains fixed (constant) over the course of its motion. As a consequence, a motion of a rigid body can be described as a combination of a translational motion, which can be described by a translational vector velocity V (hereinafter, "velocity") and a rotational motion, which can be described by an angular velocity h (hereinafter, "angular velocity").

Frequency-modulated continuous-wave (FMCW) LiDAR can provide both range information and radial velocity by linearly "chirping" the frequency of a continuous optical signal. The chirp is generally allowed to rise for a time sufficient for the signal to reach an object from which the signal will be reflected. The reflected signal is mixed with a local oscillator and the detector measures the differences in frequency. Processing the differences in frequencies at different portions of the chirped signal can be used to compute the Doppler shift, which is proportional to the object's radial velocity relative to the sensor.

A typical LiDAR emits signals in multiple directions to obtain a wide view of the outside environment. For example, a transmitter of a LiDAR device can cover an entire 360-degree view in a series of consecutive frames identified with timestamps.

"Frame" or "sensing frame," as used herein, can refer to the entire 360-degree view of the environment obtained, or, alternatively, to any smaller sector, e.g., a 1-degree, 5-degree, a 10-degree, or any other angle obtained. Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame. A single object, such as another vehicle, a road sign, a pedestrian, and so on, as well as the autonomous vehicle itself, can generate multiple return points. For example, a 10-degree frame can include returns from one or more road signs, multiple vehicles located at various distances from the LiDAR device (mounted on the autonomous vehicle) and moving with different speeds in different directions, a pedestrian crossing a roadway, walking along a sidewalk, or standing by the roadside, and many other objects. Segmenting (performed by a perception system of the autonomous vehicle) a given point cloud into clusters that correspond to different objects is a foundational task in the autonomous driving technology. Points that are close (e.g., are separated by a small angular distance and correspond to reflections from similar distances) can nonetheless belong to different objects. For example, a traffic sign and a pedestrian standing close to the sign can generate close return points. Similarly, a car moving along a bicycle in an adjacent lane can generate close return points.

Point clouds contain numerous points, with a large number of those points being returned by the ground, buildings, and other objects that are not moving and outside of the driving path that do not need to be recognized. Thus, identifying and classifying objects based on such points requires significant computational power. Some of the detected non-moving points, however, still need to be processed, for example, if they correspond to objects that obstruct the driving path, road signs that need to be read, etc.

Non-moving points can be classified into "ground points" and "static points." Ground points correspond to points reflected from the roadway or sidewalk. Moving points may also be classified as ground points if they are detected within a threshold vertical distance from the ground. The location of the ground may be derived from elevation maps and may be computed based on a known vertical displacement of the LiDAR device with respect to the ground. "Static points" correspond to return points from non-moving objects having low or substantially zero velocity with respect to the ground (or alternatively, equal and opposite velocity with respect to a known velocity of the autonomous vehicle).

"Self-return points" are a third type of point corresponding to reflections off of the autonomous vehicle itself. While these points appear to have velocity with respect to the ground, they have zero velocity with respect to the autonomous vehicle. The standard approach to classifying points as self-return points involves computing a large three-dimensional triangular mesh representative of the outer surfaces of the autonomous vehicle, and attempting to identify return points that are close to or encompassed by the mesh. However, this approach is computationally expensive and can often be inaccurate, resulting in the filtering of points from dynamic objects that come very close to the autonomous vehicle (e.g., a rock, another vehicle in close proximity, etc.).

Any points not classified as static, ground, or self-return points may simply be classified as "relevant points," indicating that they are relevant for the classification of objects that may affect the driving path of the AV. While removal of static, ground, and self-return points is beneficial in improving downstream computational efficiency during object classification, it is important to avoid false positives where static points are incorrectly classified as moving objects. This is particularly true in the case of self-returns points, where unfiltered self-return points may be incorrectly classified as moving objects resulting in the autonomous vehicle making potentially dangerous abrupt stops or maneuvers to avoid perceived potential collisions. In addition, it is important to avoid false negatives where moving points are incorrectly classified as static points, which may be the case when moving points are classified as ground points due being within a relatively large threshold vertical distance with respect to ground (e.g., a small animal having a height below the threshold).

Aspects and implementations of the present disclosure address these and other shortcomings of the existing technologies by utilizing radial velocity signals as the basis for filtering static points, ground points, and self-return points. For example, an FMCW LiDAR can detect points as corresponding to objects whose radial velocities are the same as the velocity of the AV along that same direction (which can be independently known or determined from a large plurality of points of the cloud), and determine that such points correspond to non-moving objects. While algorithms exist to "filter" the point cloud to eliminate non-moving points, these often require complex algorithms, for example, that utilize machine-learning models. By utilizing radial velocity (which is readily detectable with FMCW LiDAR) and using zero velocity or nonzero radial velocity as a filtering criterion, computationally-intensive filtering algorithms may be eliminated.

Aspects of the present disclosure further facilitate the identification of ground points. Current methods utilize an elevation threshold above a ground surface and consider any points below the threshold to be ground points. This approach indiscriminately removes dynamic and static points that may nevertheless be relevant to the driving path, such as small dynamic objects (e.g., animals). Some implementations described herein further utilize radial velocity to identify non-moving points that are below the threshold, thus eliminating static points close to the ground (e.g., within 30 centimeters) while maintaining dynamic points.

Aspects of the present disclosure further facilitate the identification of self-return points. Current methods of identifying self-return points utilize a three dimensional mesh that is complex so as to accurately model the external contours of the AV (e.g., using small and large triangular faces), with curvier vehicles requiring more complex meshes. This approach requires a tradeoff between accuracy and computational complexity, with more complex meshes yielding higher accuracy but requiring significant processing power, and less complex meshes requiring less processing power but sacrificing accuracy. By leveraging radial velocity as a condition for classifying self-return points, a less complex mesh may be utilized by identifying points that are within the mesh (which may be relatively close or slightly further away from the actual AV geometry) and then classifying points having zero radial velocity as self-returns. Points within close proximity of the AV that have zero measured radial velocity with respect to the sensor will most likely correspond to self-return points. This allows the requirement for a complex mesh to be relaxed, thus maintaining highly accurate classifications while maintaining efficiency.

FIG. 1 is a diagram illustrating components of an example autonomous vehicle (AV) 100 that uses Doppler-assisted object identification and tracking, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g., farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more LiDAR sensors 122 (e.g., LiDAR rangefinders), which can be a laser-based unit capable of determining distances (e.g., using ToF technology) to the objects in the driving environment 110. The LiDAR sensor(s) can utilize wavelengths of electromagnetic waves that are shorter than the wavelength of the radio waves and can, therefore, provide a higher spatial resolution and sensitivity compared with the radar unit. The LiDAR sensor(s) can include a coherent LiDAR sensor, such as an FMCW LiDAR sensor. The LiDAR sensor(s) can use optical heterodyne detection for velocity determination. In some implementations, the functionality of a ToF and coherent LiDAR sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple LiDAR sensor(s) 122 units can be mounted on AV, e.g., at different locations separated in space, to provide additional information about a transverse component of the velocity of the reflecting object, as described in more detail below.

The LiDAR sensor(s) 122 can include one or more laser sources producing and emitting signals and one or more detectors of the signals reflected back from the objects. The LiDAR sensor(s) 122 can include spectral filters to filter out spurious electromagnetic waves having wavelengths (frequencies) that are different from the wavelengths (frequencies) of the emitted signals. In some implementations, the LiDAR sensor(s) 122 can include directional filters (e.g., apertures, diffraction gratings, and so on) to filter out electromagnetic waves that can arrive at the detectors along directions different from the retro-reflection directions for the emitted signals. The LiDAR sensor(s) 122 can use various other optical components (lenses, mirrors, gratings, optical films, interferometers, spectrometers, local oscillators, and the like) to enhance sensing capabilities of the sensors.

In some implementations, the LiDAR sensor(s) 122 can be 360-degree unit in a horizontal direction. In some implementations, the LiDAR sensor(s) 122 can be capable of spatial scanning along both the horizontal and vertical directions. In some implementations, the field of view can be up to 90 degrees in the vertical direction (so that at least a part of the upper hemisphere is covered by the LiDAR signals). In some implementations, the field of view can be a full sphere (consisting of two hemispheres). For brevity and conciseness, when a reference to "LiDAR technology," "LiDAR sensing," "LiDAR data," and "LiDAR," in general, is made in the present disclosure, such reference shall be understood also to encompass other electromagnetic sensing technology, such as the radar technology, where applicable.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the LiDAR sensing data (coherent Doppler data and incoherent ToF data) to determine distances to various objects in the environment 110 and velocities (radial and, in some implementations, transverse) of such objects. In some implementations, the perception system 132 can use the LiDAR data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the LiDAR data, the perception system 132 can determine the distance from the rock to the AV and, therefore, by combining the distance information with the angular size of the rock, the perception system 132 can determine the linear dimensions of the rock as well.

In another implementation, using the LiDAR data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction. The perception system 132 can have a point cloud filtering module (PFM) 133. PFM 133 can receive one or more sensor data frames from the sensing system 120. Each of the sensor frames can include multiple points. Each point can correspond to a reflecting surface from which a signal emitted by the sensing system 120 (e.g., by an FMCW sensor of LiDAR sensor(s) 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the LiDAR data whereas the angles can be independently known from synchronizer data or clock data, e.g., based on the known frequency of rotation of the transmitter within the horizontal plane. The velocity data can be provided to PFM 133 by LiDAR sensor(s) 122, in one implementation, based on Doppler-assisted sensing technology. PFM 133 can use one or more algorithms to process, classify, and filter various sets of points, which can be used by the perception system 132 for efficient and reliable detection and tracking of objects.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
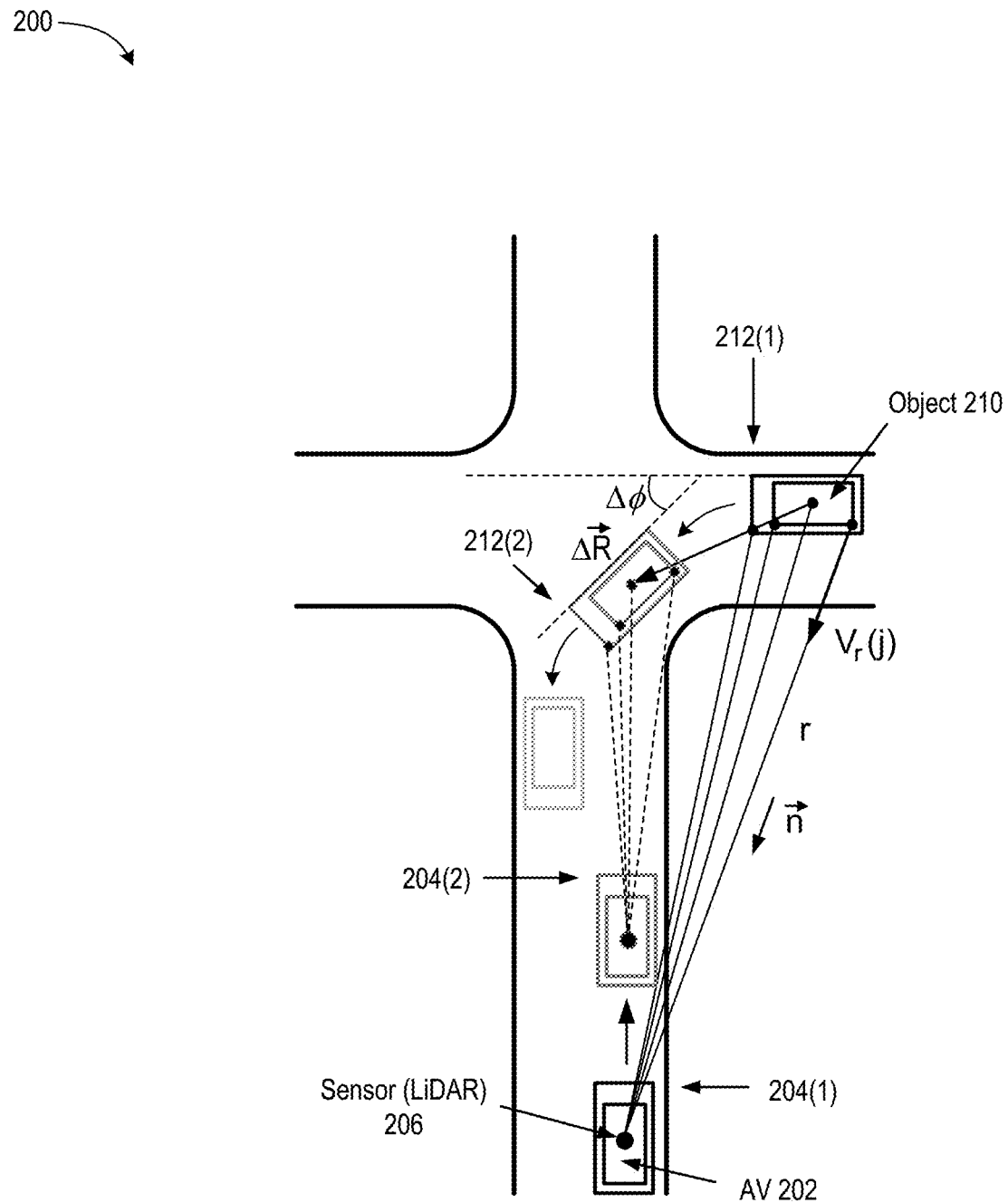
FIG. 2 is an illustration of a Doppler-assisted object identification and tracking setup that utilizes velocity reconstruction, as part of a perception system of an autonomous vehicle, in accordance with some implementations of the present disclosure.

FIG. 2 is an illustration 200 of a Doppler-assisted object identification and tracking setup that utilizes velocity reconstruction, as part of a perception system of an autonomous vehicle, in accordance with some implementations of the present disclosure. Depicted in FIG. 2 is AV 202 (which can be AV 100 or any other AV) approaching an intersection. The AV 202 has a sensor 206, which can be a LiDAR, such as a coherent LiDAR, an FMCW LiDAR, a hybrid coherent/ToF LiDAR, a combination of a coherent and incoherent LiDAR. etc., or any other device that allows to sense the radial velocity information in addition to the range (distance) information. The sensor 206 performs scanning of the driving environment of AV 202. In particular, the sensor 206 can sense multiple return points for each sensing frame. The sensing frames can be separated by time increments $\Delta\tau$. The time increments refer to time differentials between signals emitted into (or returned from) the same direction, as different directions can be probed with signals at slightly different times. More specifically, $\Delta\tau$ can be a duration of the sensor (e.g., LiDAR transmitter) cycle (e.g., a period of revolution of the sensor's transmitter); with N points around the full 360-degree horizontal view, so that any two adjacent directions of sensing can be probed with the time lead/lag of $\Delta\tau/N$.

An object 210 (e.g., a car, a truck, a bus, a motorcycle, or any other object) can be approaching the intersection and making a left turn, as depicted in FIG. 2. Two consecutive locations of AV, e.g., 204(1) and 204(2), corresponding to two consecutive LiDAR frames taken at times $\tau$ and $\tau+\Delta\tau$ are shown. Similarly, the locations of object 210 for the two frames $\tau$ and $\tau+\Delta\tau$ are shown as 212(1) and 212(2), respectively.

It should be understood that the displacement of AV 202 and object 210 shown in FIG. 2 between two consecutive frames is exaggerated for illustrative purposes and that, in reality, various objects can change their locations over the time increment $\Delta\tau$ much less significantly than depicted. For example, there can be numerous frames obtained by sensor 206 while object 210 completes the left-hand turn depicted in FIG. 2.

Object 210 performs a combination of a translational motion and a rotational motion. For example, some reference point of the object 210 is translated by vector $\Delta\vec{R}$ and the object 210 is rotated around this reference point by angle $\Delta\phi$. In a flat driving environment, it can be sufficient to describe rotational motion via a single-component value $\Delta\phi$, but in non-flat 3D (in particular, flying or nautical) environments, the rotation angle can be a vector $\Delta\vec{\phi}$ whose three components describe pitch angle, yaw angle, and roll angle, respectively. The angular velocity of the object 210 characterizes the rate at which the object 210 is rotating (turning), $\vec{\Omega}=\Delta\vec{\phi}/\Delta\tau$. The linear velocity of the reference point similarly determines the rate at which the object 210 is translating, $\vec{V}=\Delta\vec{R}/\Delta\tau$. Provided that the object 210 is rigid, the knowledge of the angular velocity $\vec{\Omega}$ and the linear velocity $\vec{V}$ of some reference point O (with coordinates $\vec{R}_O$) can enable to determine the velocity of other points.

As shown in FIG. 2, at location 212(1) object 210 can reflect a number of signals (indicated by solid lines) output by the sensor 206 and generate a number of return points (shown with black circles) of the first frame. The return points should be understood as data entries (e.g., indexed by the angular directions of the output signals, or in any other way) generated by the perception system 132 based on the measurements performed by sensor 206, as part of the sensing system 120. Each return point can include: (1) distance r to the actual physical reflecting region, and (2) the radial velocity $V_r(j)$ that is equal to the component of the velocity $\vec{V}(j)$, associated with the j-th point. The radial velocity is the component of the vector velocity along the direction (described by unit vector $\vec{n}$) towards (or away from) the sensor 206: $V_r(j)=\vec{V}(j)\cdot\vec{n}$. In some implementations, only some of the return points can include the radial velocity values. For example, while ToF range measurements can be performed for each return point, only some (e.g., every fifth, tenth, and so on) of the points can be probed with the coherent LiDAR and include the velocity data. The radial velocity $V_r(j)$ is the velocity measured in the reference frame of the AV 202. Accordingly, because in a general case the AV 202 is also moving, the measured velocity $V_r(j)$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.).

At location 212(2), the object 220 can similarly reflect a new set of signals (indicated by dashed lines) output by the sensor 206 and generate a number of return points of the second frame. One or more mapping algorithms implemented by perception system 132 can determine a geometric transformation that maps the point cloud of the first frame onto the point cloud of the second frame. Such mapping can use the ICP algorithm which iteratively revises the transformation and minimizes an error metric (e.g., the mean squared error or some other pre-determined metric) based on the comparison of the transformed first point cloud with the second point cloud (or vice versa). In some implementations, other mapping algorithms can be used, such as the Kabsch algorithm, the Procrustes superimposition, and the like. Although only two sensing frames (with respective points clouds) are depicted for conciseness, similar mappings can be generated between various consecutive sensing frames (e.g., between the second frame and the third frame, between the third frame and the fourth frame, etc.) for both object identification and tracking.

As the object 210 travels moving from location 212(1) to location 212(2), the return points in the second frame correspond to reflection surfaces of the object 210 that may be different from the surfaces causing reflections of the signals of the first frame. For example when parts of the rotating object 210 previously obscured come within a field of view of sensor 206, additional return points can be detected. Conversely, some of the previously exposed return points can be absent (as the respective physical reflecting surfaces disappear from view), and so on. To address such dynamic aspect of point clouds, the algorithms executed by perception system 132 can determine bounding boxes of various identified objects, which can be three-dimensional (3D) bounding boxes.

Figure 3:
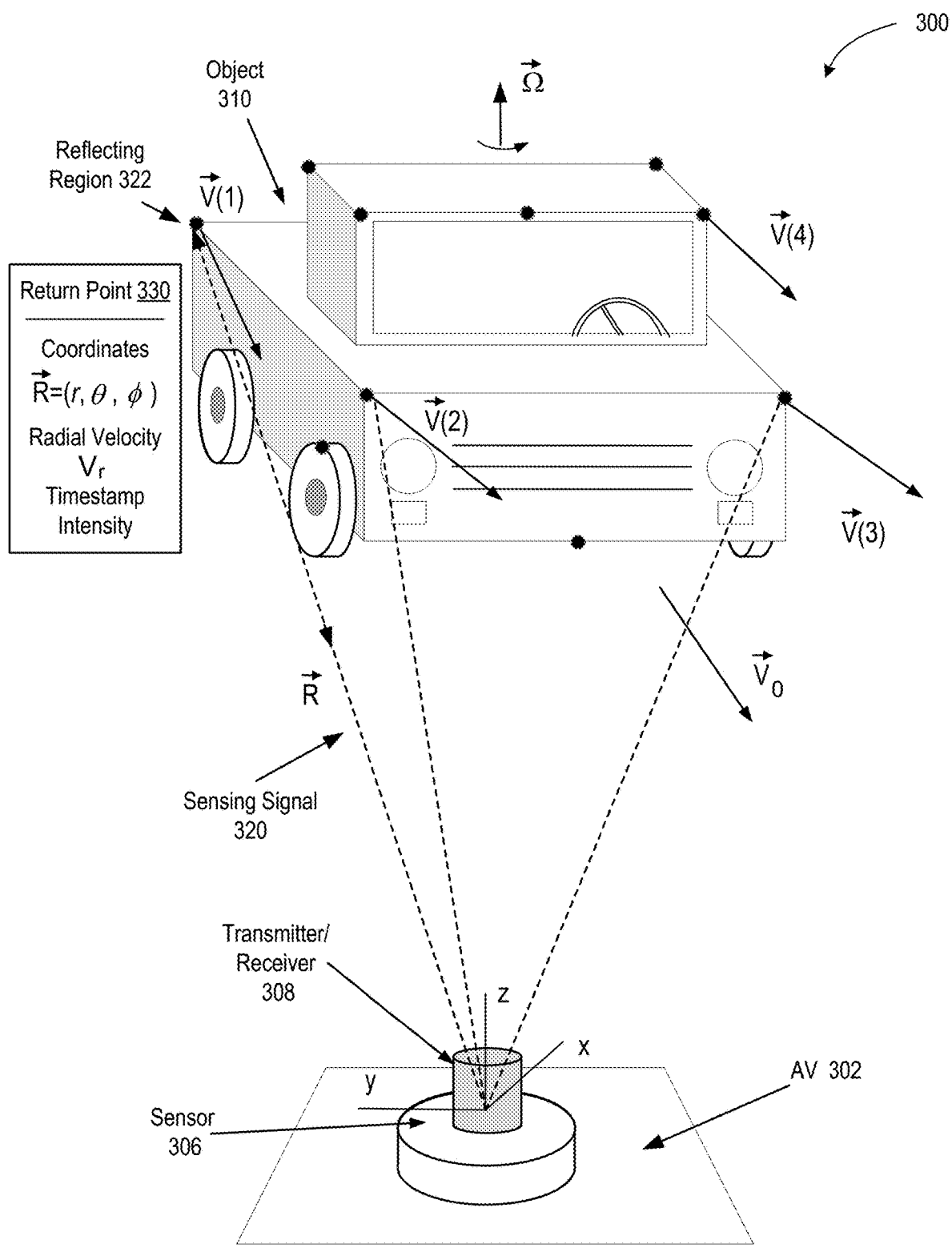
FIG. 3 is an illustration of a velocity reconstruction setup, as part of a perception system of an autonomous vehicle, in accordance with some implementations of the present disclosure.

FIG. 3 is an illustration 300 of a velocity reconstruction setup, as part of a perception system of an autonomous vehicle, in accordance with some implementations of the present disclosure. Depicted is an object 310 (e.g., a car, a truck, etc.) that is moving with some translational velocity $\vec{V}_O$ (e.g. moving forward) while simultaneously rotating with angular velocity $\vec{\Omega}$ (e.g., making a left turn). Also shown is a part of the AV 302 with a sensor 306 mounted thereon. Sensor 306 can include a rotating transmitter/receiver 308 capable of transmitting and receiving sensing (e.g., laser, radar, etc.) signals that scan the outside (relative to AV 302) environment. One sensing frame that corresponds to a single cycle of the transmitter/receiver 308 can produce multiple return points from various reflecting regions (depicted with black circles) of the object 310.

A sensing signal 320 can be emitted by a transmitting circuit of the transmitter/receiver 308, reflect from a reflecting region 322 of the object 310, return along the same path and be received by a receiving circuit of the transmitter/receiver 308. The sensing system 120 can associate a return point 330 with the sensing signal 320 and/or reflecting region 322. The return point 330 can include various data that can be extracted from the sensing signal 320, such as the coordinates (which can be in any appropriate system of coordinates, e.g., Cartesian coordinates $\vec{R}=(x, y, z)$, spherical coordinates $\vec{R}=(r, \theta, \phi)$, cylindrical coordinates $\vec{R}=(r, \phi, z)$, or any other system of coordinates); the origin of the coordinate system can be associated with the transmitter/receiver 308, as shown. The return point can also include such data as the radial velocity $V_r$, a timestamp $\tau$ associated with the sensing signal 320 (e.g., the time of the signal emission or return), the intensity of the returned signal, and other information such as the polarization of the emitted and/or received signal, and the like. Although only the data associated with the return point 330 is depicted in FIG. 3, other return points associated with the reflecting regions depicted with black circles can include the same or similar type of information. Because the object 310 can be rotating, the velocities of each of the reflecting regions, $\vec{V}(1)$, $\vec{V}(2)$, $\vec{V}(3)$, $\vec{V}(4)$ . . . , can be different from each other. Correspondingly, the detected radial velocities associated with each return point, $V_r(1)$, $V_r(2)$, $V_r(3)$, $V_r(4)$ . . . , can likewise be different from each other. This difference in the detected radial velocities can be used by PFM 133 for classifying return points and filtering the point cloud to remove static, ground, and self-return points.

Specifically, if the object 310 is a rigid body, the velocity of an element of the object having a radius-vector $\vec{R}$ can be found from the rigid body equation:

$$\vec{V}=\vec{V}_O+\vec{\Omega}\times(\vec{R}-\vec{R}_O),$$

where $\vec{R}_O$ is the radius vector of some reference point. The reference point can be any element of the object, e.g. an element associated with the return point (3) or any other return point. The choice of the reference point O can be arbitrary since the same rigid body equation exists for any other reference point O', as $$\vec{V} = \vec{V}_O + \vec{\Omega}\times(\vec{R} - \vec{R}_{O'} - \vec{R}_O + \vec{R}_{O'})$$
$$= \vec{V}_{O'} + \vec{\Omega}\times(\vec{R} - \vec{R}_{O'}),$$

where $\vec{V}_{O'}=\vec{V}_O+\vec{\Omega}\times(\vec{R}_{O'}-\vec{R}_O)$ is the linear velocity of the other reference point O'. Although the linear velocity changes when the reference point is changed, the angular velocity is independent of the choice of the reference point. This independence provides additional flexibility by enabling to choose the reference point based on convenience (e.g., near the center of the cluster of points detected by the sensing system 120).

Figure 4:
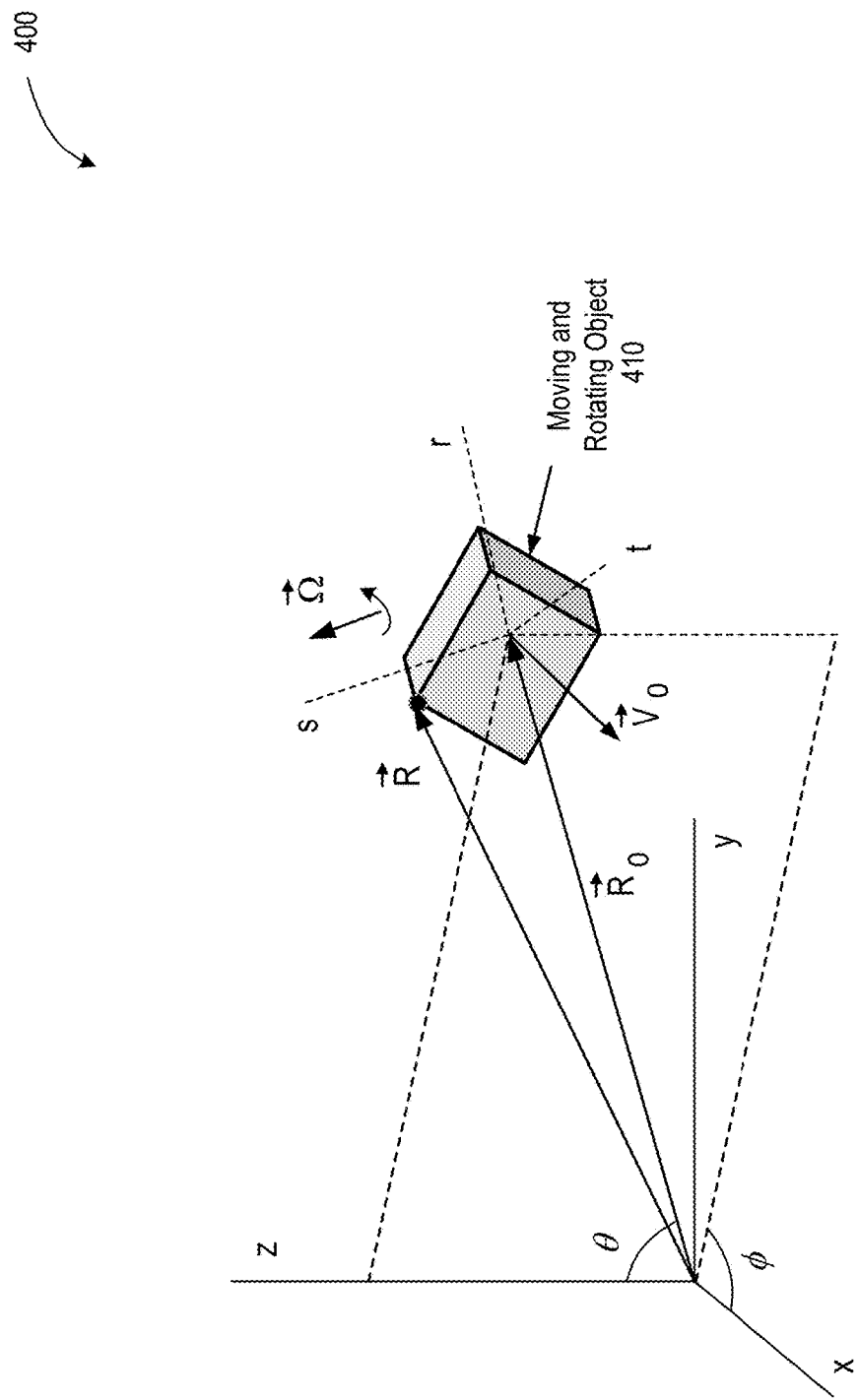
FIG. 4 is a schematic depiction of one possible geometric representation that can be used by a perception system of an autonomous vehicle, in accordance with some implementations of the present disclosure.

FIG. 4 is a schematic depiction of one possible geometric representation 400 that can be used for velocity reconstruction of object motion by a perception system of an autonomous vehicle, in accordance with some implementations of the present disclosure. Depicted schematically is a moving and rotating object 410 (e.g., a car, a plane, a body of a motorcycle, etc.) having translational velocity $\vec{V}_O$ and angular velocity $\vec{\Omega}$. Shown is a fixed system of coordinates x, y, z which can be associated with the AV (not shown), e.g., with any axes having fixed directions relative to the AV. A reference point $\vec{R}_O$ can be chosen (in some arbitrary manner) within a cluster of the return points. The reference point $\vec{R}_O$ can be chosen independently for any cluster of return points. For example, a first cluster of points corresponding to a truck located straight ahead relative to the AV can be analyzed using one reference point (e.g., some point in the middle of the cluster) whereas a second cluster of points, corresponding to a car located to the left of the AV, can be analyzed using a completely different reference point $\vec{R}_O$.

A second coordinate system can be associated with the reference point, e.g., a system of coordinates r, s, t in which the first axis r is parallel to the direction of the radius vector $\vec{R}_O$, axis t is perpendicular to axis r and parallel to the horizontal plane xy, and axis s is perpendicular to both the first axis and the second axis. The directions (unit vectors) of the axes of the second coordinate system in terms of the polar angle $\theta$ and azimuthal angle $\phi$ of the radius vector $\vec{R}_O$ are $\hat{r}=\sin\theta\cos\phi\hat{x}+\sin\theta\sin\phi\hat{y}+\cos\theta\hat{z}$, $\hat{s}=-\cos\theta\cos\phi\hat{x}-\cos\theta\sin\phi\hat{y}+\sin\theta\hat{z}$, $\hat{t}=\sin\phi\hat{x}-\cos\phi\hat{y}$.

The radial component of the velocity ("radial velocity"), as detected by, e.g., the LiDAR sensor is the dot product of the velocity $\vec{V}$ and the unit vector along the direction of the radius-vector of the return point $\vec{R}$: $V_r=\vec{V}\cdot\vec{R}/R$, where R is the magnitude of the radius vector (e.g., the distance from the sensor to the return point). According to the rigid body equation, the radial velocity is $$V_r = \vec{V}_O\cdot\frac{\vec{R}}{R} + (\vec{R}_O\times\vec{\Omega})\cdot\frac{\vec{R}}{R}.$$

In certain implementations, return points detected by an FMCW sensor can include information from which radial velocity can be derived directly. The transmission signal of the FMCW sensor (or FMCW signal) is a frequency-modulated signal from which both ranging and radial velocity can be extracted. Different types of frequency-modulated signals may be used to modulate the transmitted signal including, but not limited to, sawtooth modulation, triangular modulation, square-wave modulation, stepped modulation, and sinusoidal modulation. Triangular modulation may be particularly useful as it readily allows for radial velocity to be computed by comparing the "beat frequencies" between the transmitted signals and the reflected signals at rising and falling portions of the triangular waveform of frequency as a function of time. The beat frequency is the difference between the actual frequency of the transmission signal and the frequency of the delayed reflected signal. The Doppler shift, $f_D$, is then computed based on the beat frequency measured for the rising half of the triangular signal, $f_1$, and the beat frequency measured for the falling half of the triangular signal, $f_2$. That is, $$f_D = \begin{cases} \dfrac{f_1 + f_2}{2}, & f_2 > f_1 \\ -\dfrac{f_1 + f_2}{2}, & f_2 < f_1 \end{cases}.$$

The radial velocity for a given return point is then computed as $$V_r = \dfrac{f_D \lambda}{2}$$

where $\lambda$ is the optical wavelength of the operating frequency of the transmission signal.

Figure 5:
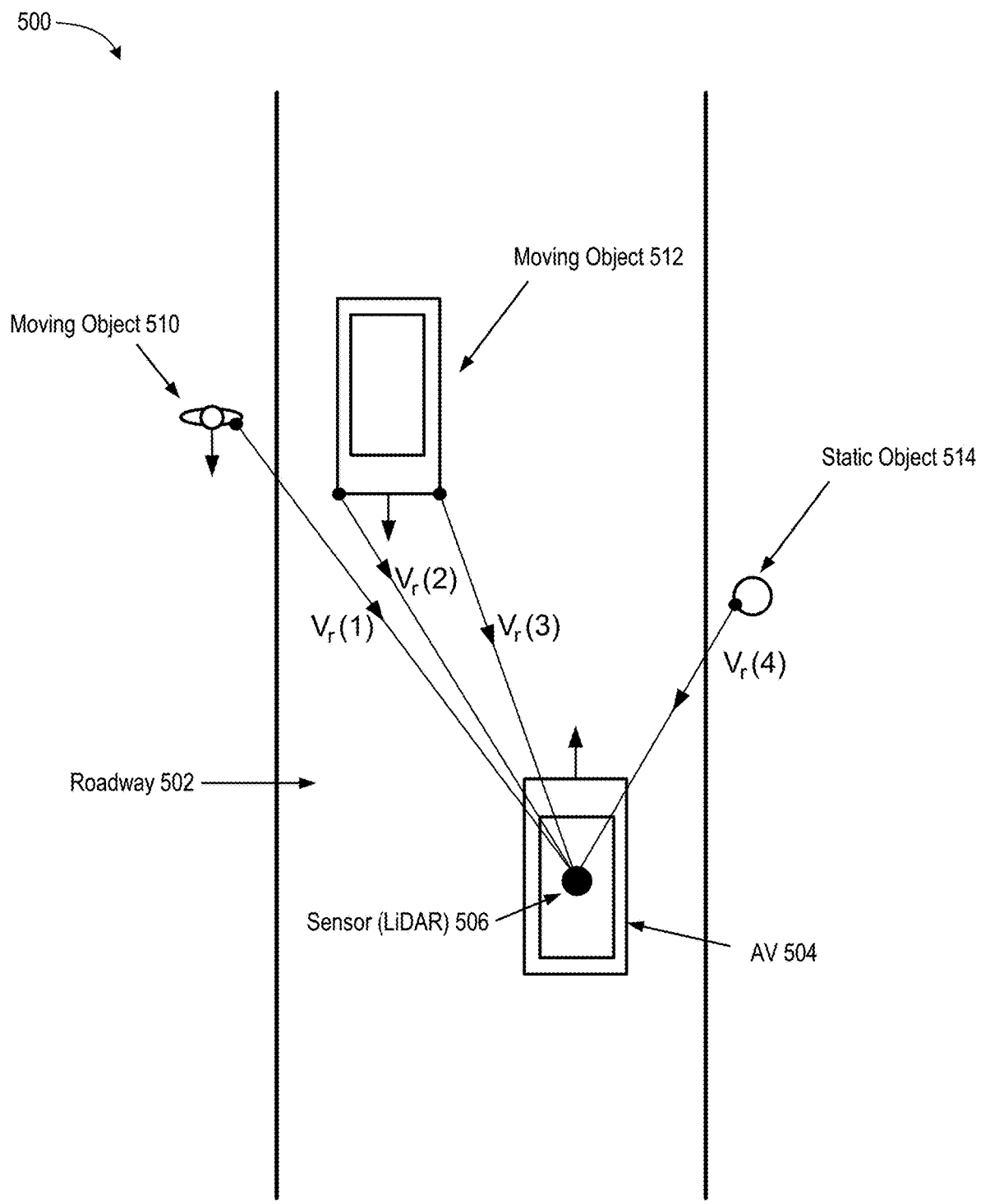
FIG. 5 is an illustration of the classification of return points as static and dynamic in accordance with some implementations of the present disclosure.

FIG. 5 is an illustration 500 of the classification of return points as static and dynamic in accordance with some implementations of the present disclosure. The AV 504 (which may be the same as or similar to AV 202) is depicted as navigating through a roadway 502, which may be a geometrically defined region for derived from roadway map data (e.g., stored in map information 135). The AV 202 may be determined to be within the roadway based on, for example, its GPS coordinates (e.g., determined by the GPS data processing module 134). A return point reflected from a static or dynamic object may be determined to be within the roadway by determining its position relative to the AV 504.

Various objects are depicted, including a moving object 510 (e.g., a pedestrian on a sidewalk), a moving object 512 (e.g., a vehicle), and a static object 514 (e.g., a fire hydrant). Other objects may also be present that are not illustrated, such as static objects within the roadway (e.g., a parked car, a pedestrian standing in the roadway, a road sign above the roadway, etc.) and dynamic objects that are not in the roadway (e.g., a moving bicycle, etc.). In some implementations, the roadway may be defined to include points and objects that are just outside of the accessible driving path of the AV 504 (e.g., 3-6 feet away from the edges of the roadway 502) to include, for example, road signs and pedestrians or vehicles that are just about to enter the driving path as part of the roadway 502.

The moving objects 510 and 512 are depicted as each having a translational velocity. Each return point (depicted as dark circles) has a respective radial velocity, $V_r$, with respect to the sensor 206 that is related to the translational velocity of the object corresponding to the return point. For example, the return point $V_r(1)$ corresponds to the moving object 510, the return points $V_r(2)$ and $V_r(3)$ correspond to the moving object 512, and the return point $V_r(4)$ corresponds to the static object 514. Similarly, the AV 504 may have its own translational velocity.

In certain implementations, when the sensor 206 is a FMCW sensor (e.g., FMCW of LiDAR sensor(s) 122), the radial velocities may be detected directly with the sensor 206 serving as the reference frame (which may be static or dynamic). To account for the movement of the AV 504, each radial velocity is offset by the velocity of the AV 504 computed along a vector from the sensor 206 to a given return point. In the case of the moving objects 510 and 512, the radial velocities $V_r(1)$, $V_r(2)$, and $V_r(3)$ can correspond to nonzero values when offset by the velocity of the AV 504 (that is, each of $V_r'(1)$, $V_r'(2)$, and $V_r'(3)$ can be nonzero). The static object 514 can have a zero (or substantially small) radial velocity when the offset is applied. This is because the velocity of the AV 504 along the vector from the sensor 206 to the static object 514 can be equal and opposite to the "raw" (i.e., directly measured) radial velocity $V_r(4)$ of the static object 514. Thus, while $V_r(4)$ as measured can be nonzero with respect to the sensor 206 (i.e., it appears to be approaching the sensor 206), the offset radial velocity, $V_r'(4)$, can be zero.

The point cloud, which contains only the four points shown for simplicity, corresponds to an initial or unfiltered point cloud. Static points may be filtered based on their offset radial velocity values. For example, in certain implementations, return points can be classified as static or non-static (dynamic) depending on whether their radial velocities (when offset by the velocity of the AV 504) is zero (or within a threshold range around zero) or nonzero (or outside of the threshold range around zero). In the illustration 500, the offset radial velocities $V_r'(1)$, $V_r'(2)$, and $V_r'(3)$ can each be nonzero for these return points because their respective objects are not stationary. The offset radial velocity $V_r'(4)$ can be zero (or close to zero and within the threshold range) because it corresponds to the static object 514. Thus, in certain implementations, prior to any downstream object classification, the initial point cloud can be filtered to remove the return point corresponding to the static object 514, leaving behind only the return points corresponding to dynamic objects. In some implementations, static return points that are detected within the roadway may not be filtered from the point cloud. For example, if the static object 514 is detected to be within the roadway 502, it will not be filtered and will be used in downstream object classification to ensure that the driving path of the AV 504 is adjusted to avoid a collision.

Figure 6:
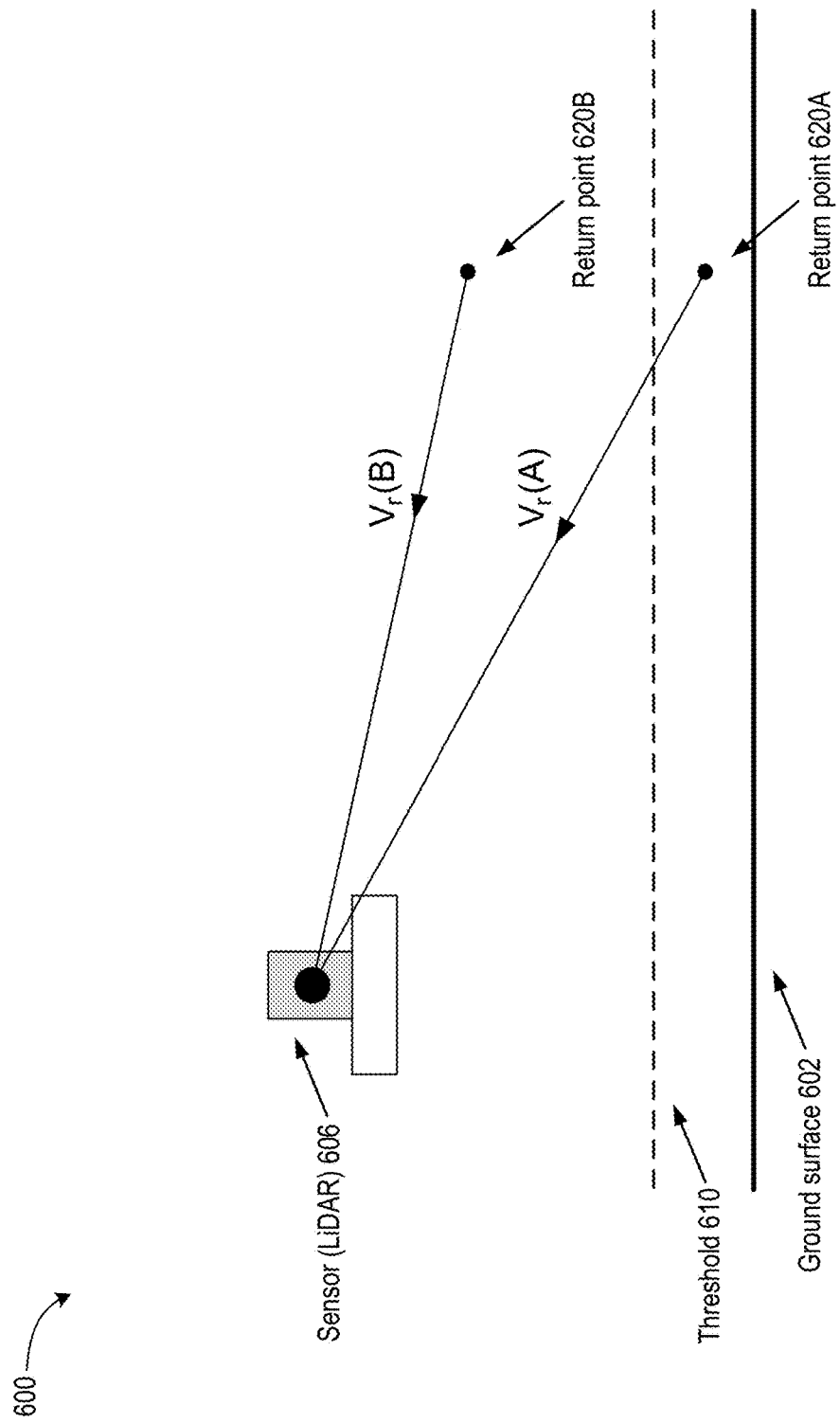
FIG. 6 is an illustration of the classification of ground points in accordance with some implementations of the present disclosure.

FIG. 6 is an illustration 600 of the classification of ground points in accordance with some implementations of the present disclosure. The illustration 600 shows a side view of a roadway (e.g., the roadway 502) showing a sensor 606 (which may be the same as or similar to the sensor 204) situated above a ground surface 602. The ground surface 602 is depicted as a flat surface for simplicity, though convex and concave surfaces may also be present. The threshold 610 corresponds to a vertical elevation above the ground surface 602 (e.g., 5 to 30 centimeters), below which return points from static objects may be classified as ground points. Return points 620A and 620B correspond to return points that have been detected as being within a roadway (as discussed above with respect to FIG. 5), and correspond to static objects having measured radial velocities $V_r(A)$ and $V_r(B)$, respectively. If the sensor 606 is stationary with respect to the ground surface 602, the offset radial velocity (as discussed above with respect to FIG. 5) can be the same as the measured radial velocity (e.g., $V_r'(A)=V_r(A)$, and $V_r'(B)=V_r(B)$).

In certain implementations, a return point can be classified as a ground point if it has an offset radial velocity that is zero (or within a threshold range around zero) and it is within the threshold 610. Since the return points 620A and 620B are within the roadway, they may not be classified as static points for the purposes of filtering. The return point 620A may be classified instead as a ground point because it is determined to be static based on its offset velocity and is below the threshold 610. The return point 620B may not be classified as a ground point.

Figure 7:
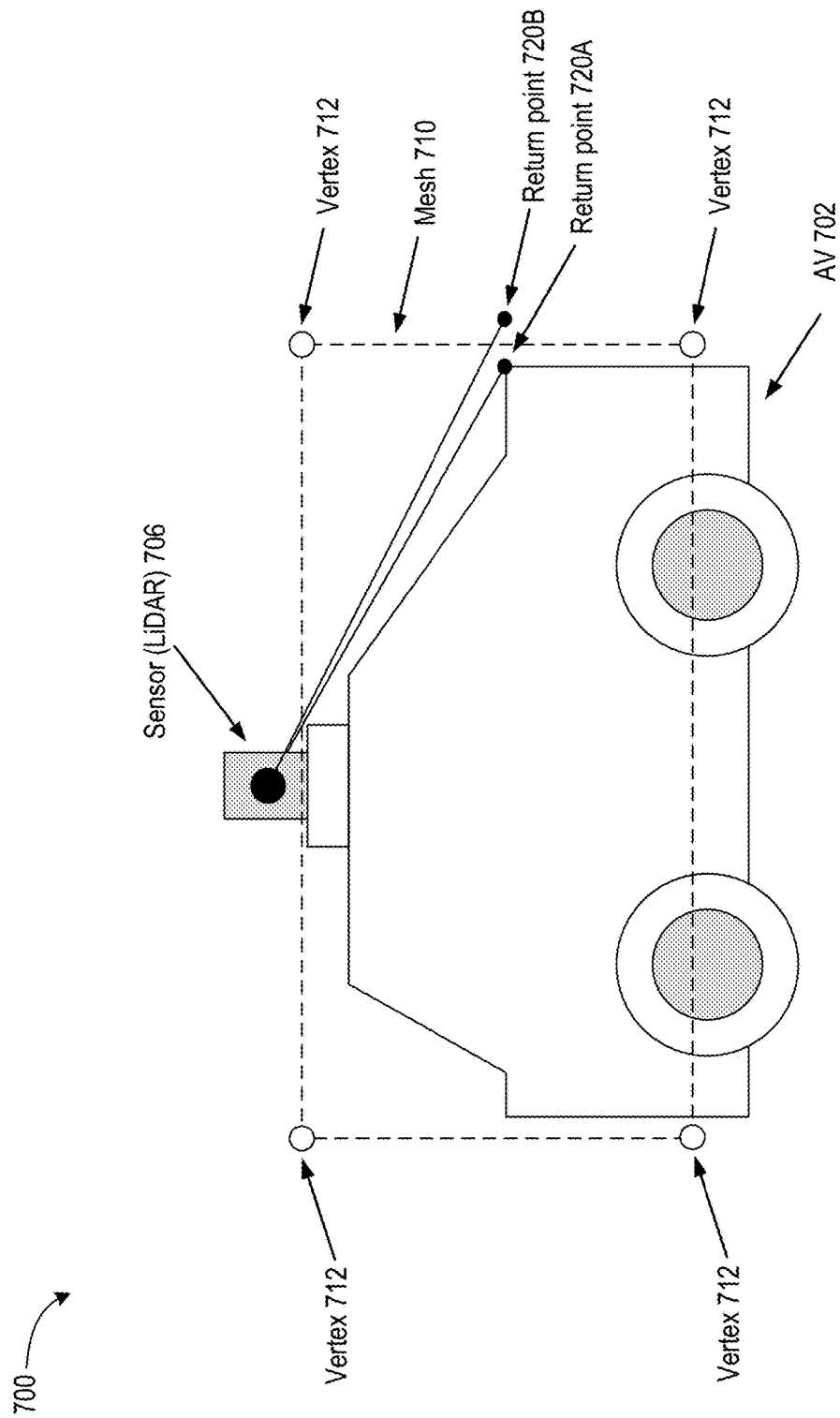
FIG. 7 is an illustration of the classification of self-return points in accordance with some implementations of the present disclosure.

FIG. 7 is an illustration 700 of the classification of self-return points in accordance with some implementations of the present disclosure. The illustration 700 depicts an AV 702 (which may be the same as or similar to the AV 202) and a sensor 706 (which may be the same as or similar to the sensor 206, such as an FMCW sensor). A three-dimensional mesh 710 is spatially defined with respect to the sensor 706 to encompass at least a portion of the AV 702 (e.g., only portions to which a direct line-of-sight exists to the sensor 706), and is defined by a plurality of rectangular or triangular faces connected to each other at vertices 712. For simplicity, the mesh 710 is depicted as a rectangle, though it is to be understood that the mesh 710 corresponds to a three-dimensional rectangular prism that encompasses at least a portion of the AV 702, and includes at least 8 vertices. In certain implementations, meshes of other geometries may be used, which may include at least 4, at least 5, at least 6, at least 7, or at least 8 vertices. In certain implementations, the mesh is an open mesh. In certain implementations, the number of vertices may be increased to obtain a mesh geometry that more closely tracks the geometry of the outer surfaces of the AV 702. The mesh 710 may be further defined to leave a small buffer region between the outer surfaces of the AV 702 and the mesh 710 boundary (e.g., a 1-6 inch buffer).

Return point 720A represents a self-return point, which is reflection from a surface of the AV 702 itself. Since the return point 720A is static with respect to the sensor 706, its measured radial velocity (without any offset) may be zero or substantially zero. The return point 720A can, in certain implementations, be classified as a self-return point because it is detected within the mesh 710. On the contrary, return point 720B may not be classified as a self-return point because it is outside of the mesh 710 regardless of its measured radial velocity. In such implementations, using direct measurements of radial velocity (e.g., by an FMCW sensor) as a condition for classifying a return point as a self-return point eliminates the need to utilize a highly complex mesh that closely tracks the external surfaces of the AV 702. This represents an improvement in accuracy over current approaches that utilize the mesh as the only condition for identifying self-points, which can lead to incorrect classifications of self-return points. Moreover, the mesh need not be complex and may use significantly fewer vertices (e.g., less than or equal to 1,000, less than or equal to 500, or less than or equal to 100 vertices). A low-polygon mesh can be used and still accurately classify self-return points because points with radial velocity within a short distance from the outermost surfaces of the AV 702 are highly likely to correspond to self-return points. As used herein, a "low-polygon mesh" refers to a mesh defined by no more than 1,000 vertices.

Figure 8:
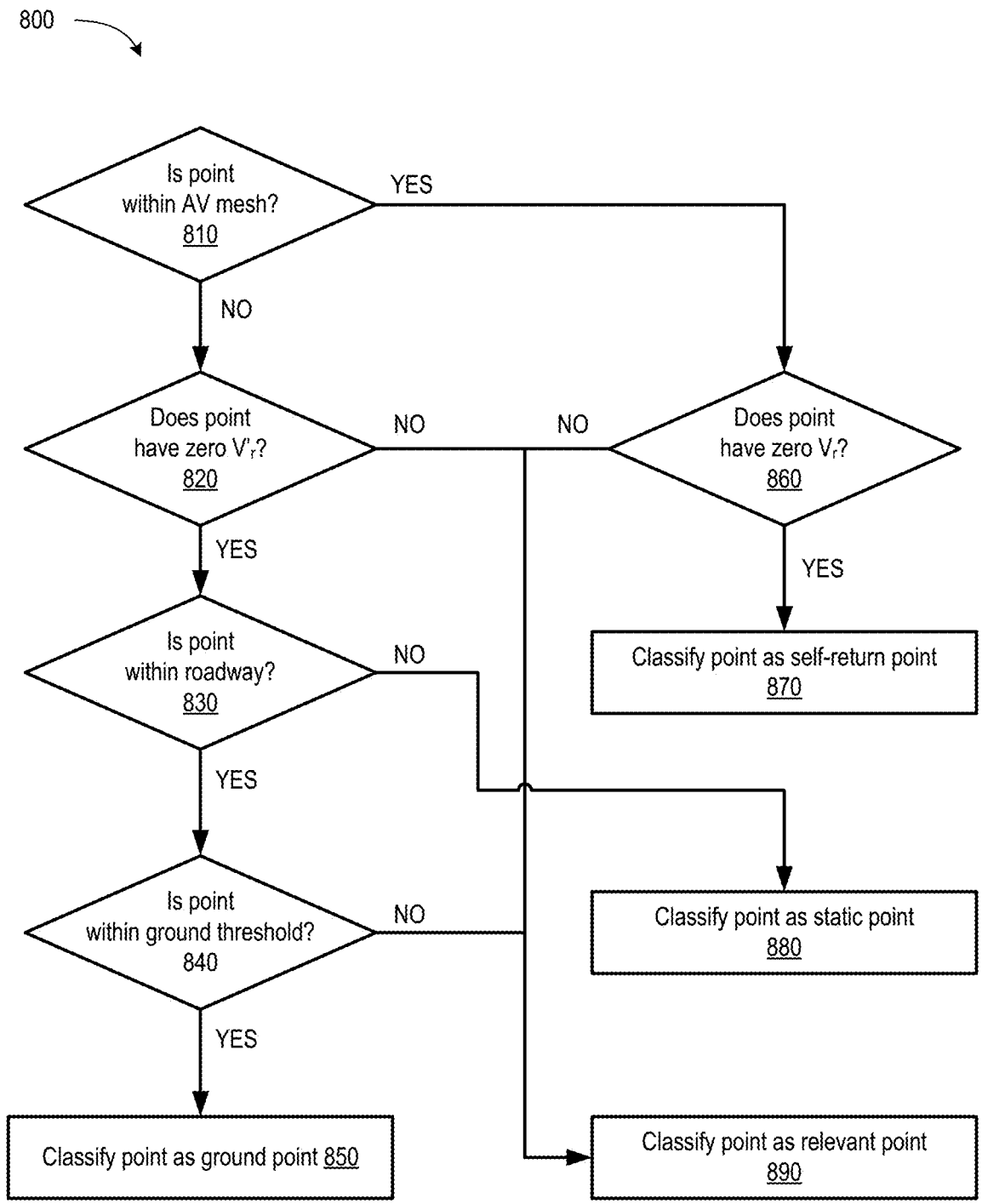
FIG. 8 depicts a flow diagram of an example method of classifying return points in accordance with some implementations of the present disclosure.

FIG. 8 depicts a flow diagram of an example method 800 of classifying return points in accordance with some implementations of the present disclosure. Method 800, as well as method 900 described below, and/or each of their individual functions, routines, subroutines, or operations can be performed by a processing device, having one or more processing units (CPU) and memory devices communicatively coupled to the CPU(s). The processing device executing methods 800 and 900 can perform instructions from various components of the perception system 132, e.g., the PFM 133. In certain implementations, methods 800 and 900 can be performed by a single processing thread. Alternatively, methods 800 and 900 can be performed by two or more processing threads, each thread executing one or more individual functions, routines, subroutines, or operations of the method. In an illustrative example, the processing threads implementing methods 800 and 900 can be synchronized (e.g., using semaphores, critical sections, and/or other thread synchronization mechanisms). Alternatively, the processing threads implementing methods 800 and 900 can be executed asynchronously with respect to each other. Various operations of methods 800 and 900 can be performed in a different order compared with the order shown in FIG. 8 and FIG. 9. Some operations of the methods can be performed concurrently with other operations. Some operations can be optional.

Method 800 can be directed to systems and components of an autonomous driving vehicle, such as the autonomous vehicle 100 of FIG. 1. Method 800 can be used to improve performance of the data processing system 130 and/or the AVCS 140, and may be applied to each detected return point in a point cloud in sequence or concurrently. At block 810, method 800 determines whether a given return point is within a three-dimensional mesh representative of an AV (e.g., mesh 710). If the point is determined to fall within the mesh, the method 800 proceeds to block 860, where the method 800 then determines whether the return point has a zero radial velocity $V_r$ (e.g., as directly detected by and computed from an FMCW signal). If the radial velocity is zero, the point is classified as a self-return point at block 870. Otherwise, the point is classified as a relevant point at block 890, and may be used downstream in an object identification and classification process.

If, at block 810, method 800 determines that the point is not within the mesh, method 800 proceeds to block 820 where it determines whether the point has zero (or substantially zero) offset radial velocity $V'_r$. If the offset radial velocity is nonzero, the point is classified as a relevant point at block 890. Otherwise, method 800 proceeds to block 830 where it determines whether the point is within a roadway (e.g., based on road map data and the physical location of the point relative to the AV and its GPS coordinates).

If, at block 830, method 800 determines that the point is within the roadway, method 800 proceeds to block 840 where it determines whether the point is within a ground threshold. If the point is determined to not be in the roadway, it is classified as a static point at block 880.

If, at block 840, method 800 determines that the point is within the ground threshold (e.g., threshold 610 as described with respect to FIG. 6), the point is classified as a ground point at block 850. Otherwise, the point is classified as a relevant point at block 890.

Figure 9:
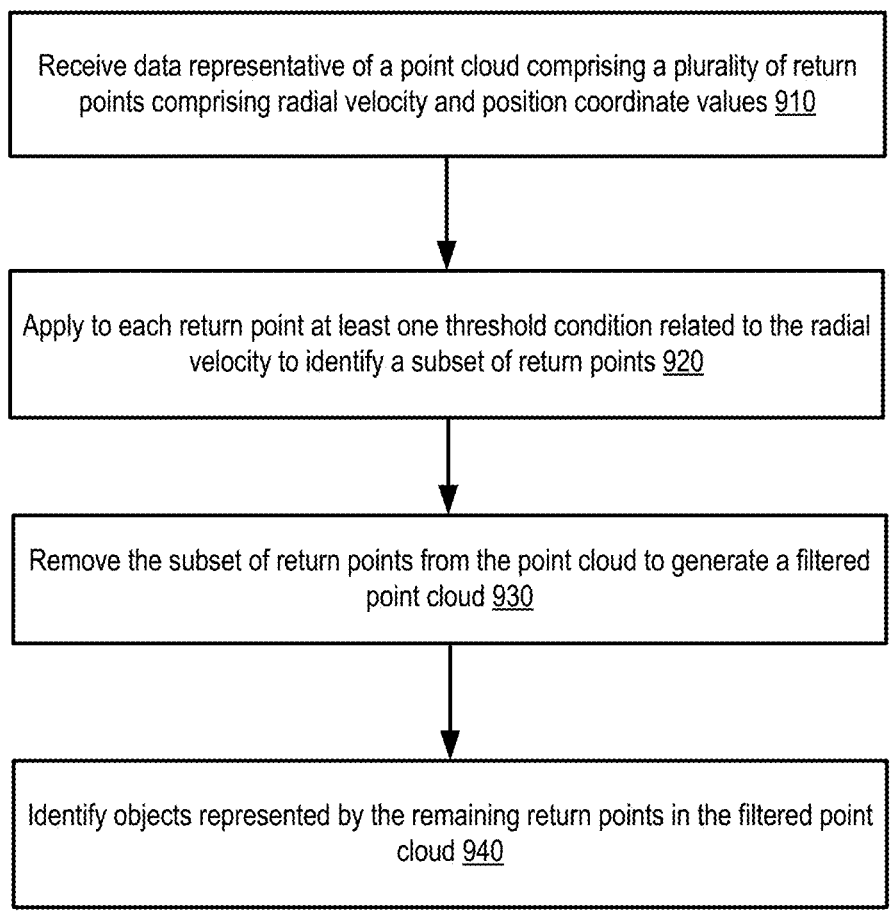
FIG. 9 depicts a flow diagram of an example method of filtering return points in a point cloud based on radial velocity measurements in accordance with some implementations of the present disclosure.

FIG. 9 depicts a flow diagram of an example method 900 of filtering return points in a point cloud based on radial velocity measurements in accordance with some implementations of the present disclosure. Method 900 can be performed in conjunction with method 800 for classifying return points.

At block 910, a sensing system (e.g., the sensing system 120) of an AV receives data representative of a point cloud comprising a plurality of return points, with each return point having a corresponding radial velocity and corresponding position coordinates representative of a reflecting region that reflects a transmission signal emitted by the sensing system. Obtaining return points can include some or all of the following. One or more sensors (e.g., LiDAR, FMCW, hybrid ToF/coherent LiDAR, and so on) of the sensing system of the AV can emit a series of signals (e.g., optical signals). The signals can be emitted in a periodic (cyclic) pattern in various directions, for example, forming the 360-degree panoramic pattern. The signals can strike various objects (moving or stationary) and reflect back towards the sensor from various reflecting regions of the objects. The number of reflecting regions can vary depending on the nature, size of the object, the object's level of occlusion by other objects. The intensity of the reflected signals can depend on the physical properties (i.e., material, surface type, etc.) of the reflecting region, the wavelength of the signal, polarization, etc. Based on the characteristics and timing of the reflected signals, the sensing system of the AV can generate a plurality of return points. The return points are data entries that are associated with a reflection of one of the emitted signals from an object of the environment. The return points can be generated in real time. Each return point can include various data entries, such as a timestamp of a cycle of the sensor, intensity of the returned signals, or polarization of the returned signals. Each return point can include two or more coordinates of the respective reflecting region. For example, the coordinates can be a distance to the reflecting region (e.g., determined from the time of flight of the returned signals), and one or more directional angles, such as the azimuthal angle specifying direction within the horizontal plane and the polar angle specifying the elevation above (or below) the horizontal plane. Each return point can further include a velocity value; the velocity value can represent the radial component of the velocity of the reflecting region with respect to the radial direction from a transmitter of the sensing system towards the reflecting region.

The sensor can be a coherent light detection and ranging device (LiDAR) capable of detecting the radial velocity using, e.g., Doppler-assisted sensing. In some implementations, the coherent LiDAR can be a frequency-modulated continuous-wave LiDAR and the signals emitted by the sensor can include phase-modulated or frequency-modulated electromagnetic waves. The sensor can also be capable of concurrently emitting various other signals, such as pulsed signals, which can be used for ToF distance measurements. In some implementations, the sensor can include separate ToF LiDAR and a coherent LiDAR, each emitting separate signals that can be synchronized, mixed, and transmitted along the same optical paths. In certain implementations, the sensor is an FMCW LiDAR configured to transmit and receive FMCW signals. In certain implementations, radial velocity values may be derived from each of the plurality of return points based on reflected FMCW signals.

The return points can belong to (e.g., be associated with) various sensing frames corresponding to different cycles (e.g., revolutions) of the transmitter(s) of the sensing system. For example, a first sensing frame can correspond to a first cycle, a second sensing frame can correspond to a different (e.g., earlier or later) cycle. The terms "first" and "second" should be understood as identifiers only and should not presuppose a specific order. In particular, there can be an arbitrary number of intervening frames between the first frame and the second frame.

At block 920, a perception system of the AV (e.g., one or more processing devices implementing the PFM 133) applies, to each of the plurality of return points, at least one threshold condition related to the radial velocity value of a given return point. Points that satisfy the threshold condition may be identified as a subset within the plurality of return points that share a common classification. In certain implementations, applying a threshold condition comprises classifying, as static points, return points determined to have a radial velocity that, when offset by a velocity of the AV, is within a threshold radial velocity. The threshold radial velocity may be from 0.01 meters/second (i.e., determining whether a magnitude of the offset radial velocity is less than 0.01 meters/second) to 0.2 meters/second (i.e., determining whether a magnitude of the offset radial velocity is less than 0.2 meters/second).

In certain implementations, the return points in the subset of return points correspond only to points having position coordinates that are determined to be outside of a roadway traversed by the AV in view of road map data. For example, a return point may be classified as a static point if it has zero or substantially zero radial offset radial velocity (i.e., not moving with respect to a ground surface or static reference frame) and is outside of a designated roadway.

In certain implementations, applying a threshold condition comprises classifying, as ground points, return points determined to be less than or equal to an elevation threshold with respect to the ground and having substantially zero radial velocity when offset by a velocity of the AV. For example, the elevation threshold (e.g., threshold 610) may be from 5 cm to 30 cm.

In certain implementations, applying a threshold condition comprises classifying, as self-return points, return points determined to be encompassed by a low-polygon mesh representative of the AV and having substantially zero radial velocity with respect to the AV. In certain implementations, the perception system computes the mesh (e.g., mesh 710) that at least partially encompasses the physical geometry of the AV, and compares position coordinates of the return points to determine whether or not they are encompassed by the mesh. In certain implementations, the low-polygon mesh is defined by 4 to 100 vertices.

At block 930, the perception system removes any identified subsets of return points (e.g., return points classified as static points, ground points, or self-return points) from the point cloud to generate a filtered point cloud containing relevant points. At block 940, the perception system identifies objects represented by the remaining return points in the filtered point cloud. In certain implementations, method 900 can continue with an AV control system (e.g., AVCS 14) causing a driving path of the AV to be determined in view of the identified objects. For example, the perception system could have identified an object moving with the speed of 20 mph while making a left-hand turn with the radius of 15 m and communicated this information to the AV control system. The AV control system can then determine that the AV is about to enter the same intersection before the object can compete the turn. The AV control system can determine a new path for the AV, which can include braking, changing lanes, stopping, backing up, and so on. The control system can subsequently output instructions to powertrain and steering 150, vehicle electronics 160, signaling 170, etc., to ensure that the AV follows the determined driving path.

Figure 10:
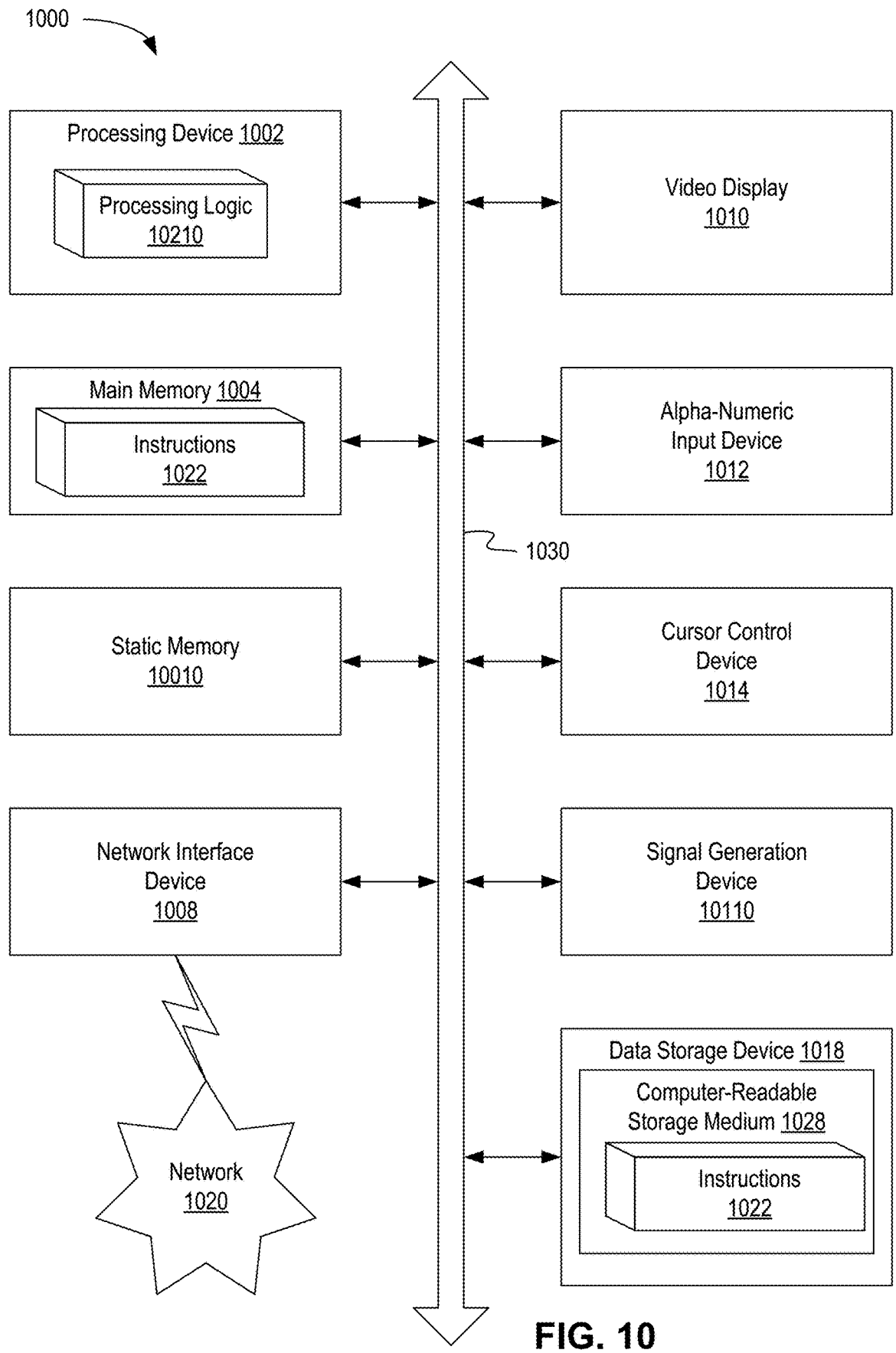
FIG. 10 depicts a block diagram of an example computer device capable of enabling Doppler-assisted object identification, tracking, and prediction for autonomous driving vehicle applications.

FIG. 10 depicts a block diagram of an example computer device 1000 capable of enabling Doppler-assisted object identification, tracking, and prediction for autonomous driving vehicle applications. Example computer device 1000 can be connected to other computer devices in a LAN, an intranet, an extranet, and/or the Internet. Computer device 1000 can operate in the capacity of a server in a client-server network environment. Computer device 1000 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1000 can include a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which can communicate with each other via a bus 1030.

Processing device 1002 represents one or more general-purpose processing devices such as a microprocessor, central processing unit, or the like. More particularly, processing device 1002 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 can be configured to execute instructions performing methods 800 and 900 as described above.

Example computer device 1000 can further comprise a network interface device 1008, which can be communicatively coupled to a network 1020. Example computer device 1000 can further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 can include a computer-readable storage medium (or, more specifically, a non-transitory computer-readable storage medium) 1028 on which is stored one or more sets of executable instructions 1022. In accordance with one or more aspects of the present disclosure, executable instructions 1022 can comprise executable instructions for performing the methods 800 and 900 as described above.

Executable instructions 1022 can also reside, completely or at least partially, within main memory 1004 and/or within processing device 1002 during execution thereof by example computer device 1000, main memory 1004 and processing device 1002 also constituting computer-readable storage media. Executable instructions 1022 can further be transmitted or received over a network via network interface device 1008.

While the computer-readable storage medium 1028 is shown in FIG. 10 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "applying," "removing," "identifying," "determining," "storing," "adjusting," "causing," "returning," "comparing," "creating," "stopping," "loading," "copying," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
receiving, by a computing device of a sensing system of an autonomous vehicle (AV), data representative of a point cloud comprising a plurality of return points, each of the plurality of return points comprising a radial velocity value and position coordinates representative of a reflecting region that reflects a transmission signal emitted by one or more sensors of the sensing system;
applying, to each of the plurality of return points, at least one threshold condition related to whether the radial velocity value of a given return point is within a threshold radial velocity to identify a subset of return points within the plurality of return points;
removing the subset of return points from the point cloud to generate a filtered point cloud;
identifying objects represented by the remaining return points in the filtered point cloud; and
causing a driving path of the AV to be determined in view of the identified objects.

2. The method of claim 1, wherein the sensing system of the AV comprises a coherent light detection and ranging device (LiDAR), and wherein the signal emitted by the sensing system comprises a frequency-modulated continuous wave (FMCW) signal.

3. The method of claim 2, wherein the radial velocity values for each of the plurality of return points are derived from reflected FMCW signals.

4. The method of claim 1, wherein applying the at least one threshold condition comprises:
classifying, as static points, return points determined to have a radial velocity that, when offset by a velocity of the AV, is within the threshold radial velocity, wherein the subset of return points corresponds to the classified static points.

5. The method of claim 4, wherein the return points in the subset of return points correspond only to points having position coordinates that are determined to be outside of a roadway traversed by the AV in view of road map data.

6. The method of claim 1, wherein applying the at least one threshold condition comprises:
classifying, as self-return points, return points determined to be encompassed by a low-polygon mesh representative of the AV and having substantially zero radial velocity with respect to the AV, wherein the low-polygon mesh is defined to encompass physical geometry of the AV, wherein the subset of return points corresponds to classified self-return points.

7. The method of claim 1, wherein applying the at least one threshold condition comprises:
classifying, as ground points, return points determined to be less than or equal to an elevation threshold with respect to the ground and having substantially zero radial velocity when offset by a velocity of the AV, wherein the subset of return points corresponds to the classified ground points.

8. A system comprising:
a sensing system of an autonomous vehicle (AV) comprising a computing device and one or more sensors communicatively coupled thereto, wherein the computing device is to:
receive data representative of a point cloud comprising a plurality of return points, each of the plurality of return points comprising a radial velocity value and position coordinates representative of a reflecting region that reflects a transmission signal emitted by the one or more sensors of the sensing system;
apply, to each of the plurality of return points, at least one threshold condition related to whether the radial velocity value of a given return point is within a threshold radial velocity to identify a subset of return points within the plurality of return points;
remove the subset of return points from the point cloud to generate a filtered point cloud;
identify objects represented by the remaining return points in the filtered point cloud; and
cause a driving path of the AV to be determined in view of the identified objects.

9. The system of claim 8, wherein the sensing system of the AV comprises a coherent light detection and ranging device (LiDAR), and wherein the signal emitted by the sensing system comprises a frequency-modulated continuous wave (FMCW) signal.

10. The system of claim 9, wherein the radial velocity values for each of the plurality of return points are derived from reflected FMCW signals.

11. The system of claim 8, wherein to apply the at least one threshold condition, the sensing system is to:
classify, as static points, return points determined to have a radial velocity that, when offset by a velocity of the AV, is within the threshold radial velocity, wherein the subset of return points corresponds to the classified static points.

12. The system of claim 11, wherein the return points in the subset of return points correspond only to points having position coordinates that are determined to be outside of a roadway traversed by the AV in view of road map data.

13. The system of claim 11, wherein to apply the at least one threshold condition, the sensing system is to:
classify, as ground points, return points determined to be less than or equal to an elevation threshold with respect to the ground and having substantially zero radial velocity when offset by a velocity of the AV, wherein the subset of return points corresponds to the classified ground points.

14. The system of claim 8, wherein to apply the at least one threshold condition, the sensing system is to:
classify, as self-return points, return points determined to be encompassed by a low-polygon mesh representative of the AV and having substantially zero radial velocity with respect to the AV, wherein the low-polygon mesh is defined to encompass physical geometry of the AV, wherein the subset of return points corresponds to classified self-return points.

15. A non-transitory computer-readable medium having instructions stored thereon that, when executed by a computing device of a sensing system of an autonomous vehicle (AV), cause the computing device to:
receive data representative of a point cloud comprising a plurality of return points, each of the plurality of return points comprising a radial velocity value and position coordinates representative of a reflecting region that reflects a transmission signal emitted by at least one sensor of the sensing system;

apply, to each of the plurality of return points, at least one threshold condition related to whether the radial velocity value of a given return point is within a threshold radial velocity to identify a subset of return points within the plurality of return points;

remove the subset of return points from the point cloud to generate a filtered point cloud;

identify objects represented by the remaining return points in the filtered point cloud; and cause a driving path of the AV to be determined in view of the identified objects.

16. The non-transitory computer-readable medium of claim 15, wherein the signal emitted by the sensing system comprises a frequency-modulated continuous wave (FMCW) signal.

17. The non-transitory computer-readable medium of claim 16, wherein the radial velocity values for each of the plurality of return points are derived from reflected FMCW signals.

18. The non-transitory computer-readable medium of claim 16, wherein to apply the at least one threshold condition, the computing device is to:

classify, as self-return points, return points determined to be encompassed by a low-polygon mesh representative of the AV and having substantially zero radial velocity with respect to the AV, wherein the low-polygon mesh is defined to encompass physical geometry of the AV, wherein the subset of return points corresponds to classified self-return points.

19. The non-transitory computer-readable medium of claim 16, wherein to apply the at least one threshold condition, the computing device is to:

classify, as ground points, return points determined to be less than or equal to an elevation threshold with respect to the ground and having substantially zero radial velocity when offset by a velocity of the AV, wherein the subset of return points corresponds to the classified ground points.

20. The non-transitory computer-readable medium of claim 15, wherein to apply the at least one threshold condition, the computing device is to:

classify, as static points, return points determined to have a radial velocity that, when offset by a velocity of the AV, is within the threshold radial velocity, wherein the subset of return points corresponds to the classified static points, and wherein the return points in the subset of return points correspond only to points having position coordinates that are determined to be outside of a roadway traversed by the AV in view of road map data.

* * * * *